United States Patent [19]

Kunkel et al.

[11] 4,013,327

[45] Mar. 22, 1977

[54] CLUTCH THRUST BEARING

[75] Inventors: Heinrich Kunkel; Armin Olschewski; Lothar Walter, all of Schweinfurt; Rainer Schurger, Schwanfeld; Manfred Brandenstein, Aschfeld; Erich Burkl, Stammheim, all of Germany

[73] Assignee: SKF Industrial Trading and Development Company, B.V., Nieuwegein, Netherlands

[22] Filed: Sept. 25, 1975

[21] Appl. No.: 616,575

[30] Foreign Application Priority Data

Sept. 28, 1974 Germany ............................ 2446500

[52] U.S. Cl. ............................... 308/233; 308/236; 192/98
[51] Int. Cl.² ................... F16C 19/00; F16D 23/14
[58] Field of Search ............ 308/26, 220, 232, 233, 308/236; 192/45, 98, 110 B

[56] References Cited

UNITED STATES PATENTS

| 3,741,361 | 6/1973 | Brandenstein | 192/98 X |
| 3,904,008 | 9/1975 | Sonnerat | 308/26 X |
| 3,921,775 | 11/1975 | Martyschik | 192/98 |
| 3,931,875 | 1/1976 | Ladin | 192/98 |

Primary Examiner—Philip Goodman
Assistant Examiner—Gene A. Church
Attorney, Agent, or Firm—Daniel M. Rosen

[57] ABSTRACT

A self-centering clutch thrust bearing with a resilient ring between the bore of the bearing and a sliding sleeve for damping radial play therebetween.

19 Claims, 9 Drawing Figures

CLUTCH THRUST BEARING

BACKGROUND OF THE INVENTION

The invention relates to a self-centering clutch thrust bearing arranged with radial play either on or inside a sliding sleeve. A clutch thrust bearing of the aforesaid type is known from the German Public Disclosure No. 1,944,839, wherein the lateral faces of at least one of the bearing races have been flared outward in order to form an annular space which is filled with a noise-abating plastic material. The annular gap between this clutch thrust bearing and the sliding sleeve has been dimensioned in such a way as to permit a radial motion of the thrust bearing for the purpose of its self-alignment during clutch operation. However, damping of the radial movement of the bearing has not been taken into consideration, and such damping would be possible to only a limited extent, because the plastic ring has a relatively slight elastic force. Furthermore, said known plastic ring is not able to dampen any relative motion between the sliding sleeve and the neighboring or adjacent bearing race.

SUMMARY OF THE INVENTION

It is the object of the present invention to create a clutch thrust bearing wherein the radial motion of the bearing in or on a sliding sleeve is elastically reversed once a certain motion of the clutch thrust bearing to the sliding sleeve is dampened. This task, according to the invention, is solved by providing a close fit of the elastic ring, hereinafter named the damping ring, preferably on the stationary bearing race, or on the sliding sleeve and providing said ring with resilient, springy lugs or tongues formed in the bore or on the jacket and inclined in a certain angle relative to the bearing axis.

Radial play is allowed between said elastic tongues and the sliding sleeve, or between said tongues and the bearing race, respectively. According to a further characteristic of the invention, the damping ring has means for the damping of the relative motion between the sliding sleeve and the bearing race abutting against the latter. Thus, elastic lugs or protrusions may be arranged on the damping ring which, in the case of relative motion of the damping ring towards the sliding sleeve, will abut against the latter.

Further characteristics of the invention can be seen from the following description of several embodiments shown in the attached drawings.

BRIEF DESCRIPTION OF THE DRAWINGS

In the drawings, identical parts have been given identical reference numbers.

DETAILED DESCRIPTION OF THE PREFERRED EMBODIMENTS

Figure 1:
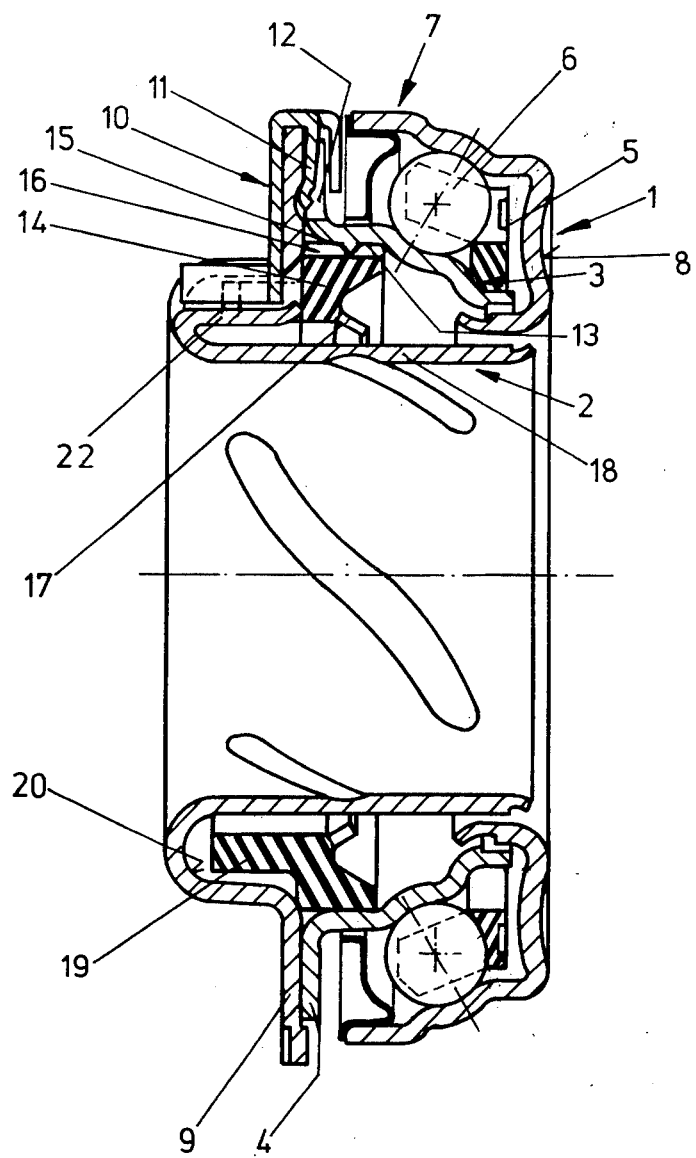
FIG. 1 is a cross-sectional view of a first embodiment of the invention, showing a self-centering clutch thrust bearing of sheet metal having a sliding sleeve and a damping ring arranged in the bore of the inner race.

FIG. 1 shows a self-centering clutch thrust bearing which is arranged on a sliding sleeve 2. The clutch thrust bearing consists of one inner race of sheet metal 3 with a flange 4 pointing radially outward, the balls 6 guided in a ball race or cage 5 and an outer race 7, also made of sheet metal, one face of which has been provided with a concave annular surface 8 designed to accommodate the clutch levers (not shown in the drawing). Bearing 1, with its flange 4 of the inner race 3, abuts against flange 9 of the sliding sleeve 2 and can move in radial direction. Flange 4 of the inner race 3 and flange 9 of the sliding sleeve 2 are encircled by a bracket 10 having a certain amount of play, so that the bearing 1 and the sliding sleeve 2 actually form one unit. The bracket 10 is mounted on the sliding sleeve 2 by means of an elastic tongue 11. Said tongue 11, with a certain amount of play, engages a recess 12 in the flange 4 of the inner race 3.

Figure 2:
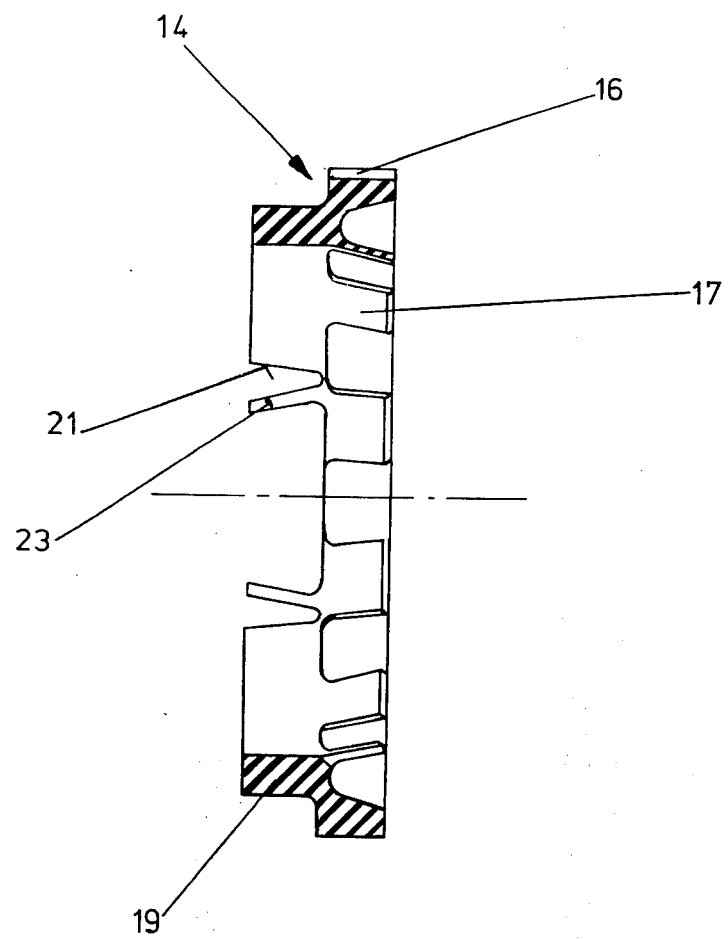
FIG. 2 is a cross-sectional view of the damping ring according to FIG. 1.
Figure 3:
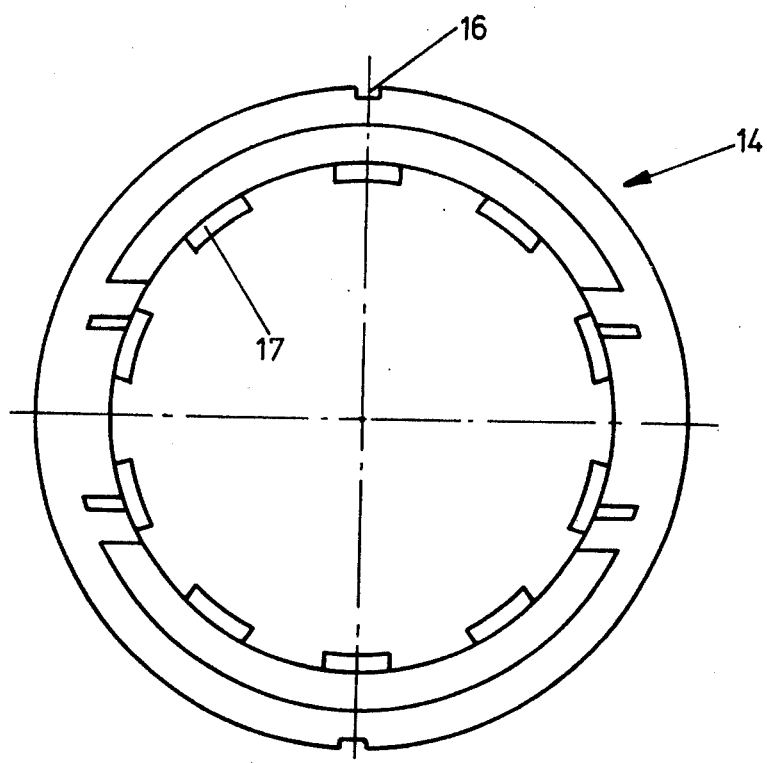
FIG. 3 is an elevation view of the damping ring of FIG. 2.

Inside the bore 13 of the inner race 3, there is a damping ring 14 of elastic material, such as plastic, with lugs 15 to prevent said damping ring from rotation in circumferential direction. These lugs 15 protrude from the inner race 3 and engage an axial groove 16 on the jacket of the damping ring 14. Within said bore, as shown in FIGS. 2 and 3, the damping ring 14 has tongues 17 which are bent in the direction of the clutch thrust bearing 1. In a concentrically arranged clutch thrust bearing, 1, between the tongues or lugs 17 of the ring and the axially extending section 18 of the sliding sleeve 2, there is a certain amount of radial play, so that a damping of the radial bearing dislocation will be effected only in such cases where said dislocation is greater than the play or clearance between tongues 17 and the sliding sleeve 2. This arrangement assures for the rolling element unit and the races of the bearing rings 3,7, protection from strong shocks emanating from the road surface, and, simultaneously, easy and effortless centering. The damping ring 14, on the side pointing away from the bearing 1, has been provided with a circumferential, axially directed shoulder 19 which extends into and engages a recess formed by convex surface 20 of the sliding sleeve 2. The shoulder 19 has two diametrically arranged recesses 21 engaged by two suitably arranged lugs 22 extending out of the sliding sleeve 2.

Provision is made to prevent any noise during engagement and disengagement of the clutch, that is, during a change of direction of rotation, caused by the surfaces of sliding sleeve 2, the bracket 10 and the damping ring 14 impacting in circumferential direction. Accordingly, the play between the resilient tongue 11, the bracket 10, and the recess 12 in the flange 4 of the inner race 3, in the direction of rotation, is greater than the play between the lugs 22 of the sliding sleeve 2 and the resilient protrusions 23 which abut against the lugs 22 of the sliding sleeve 2 and which dampen any relative motion between the damping ring 14 or the inner race connected with it respectively, and the sliding sleeve 2. The axial protrusion or lug 19 at the damping ring 14 furthermore serves as a positive stop for the limitation of the radial play between the clutch thrust bearing and the sliding sleeve 2.

Figure 4:
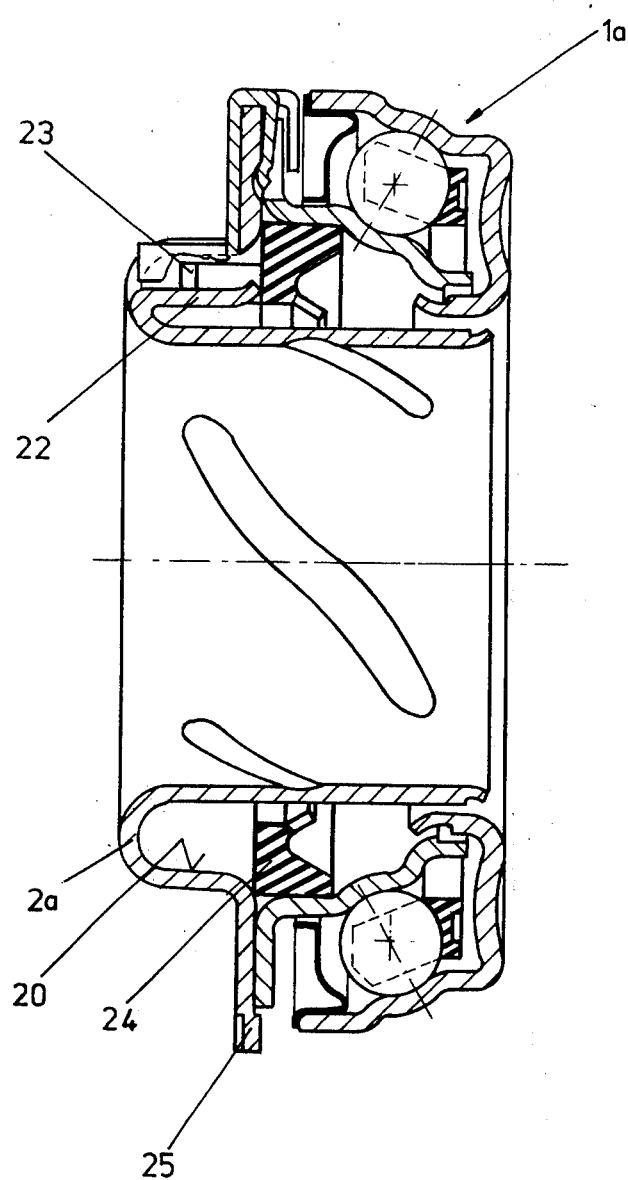
FIG. 4 is a cross-sectional view of a second embodiment of a cluth thrust bearing, with a positive stop for the limitation of the radial bearing displacement arranged at the sliding sleeve.

The embodiment 1a illustrated in FIG. 4 is distinguished from the embodiment of FIG. 1, in that the positive stop, for the limitation of the radial bearing dislocation, is situated at the sliding sleeve 2a instead of at the damping ring 24, and consists of several lugs 25 formed from the radial flange of the sliding sleeve. The circumferential shoulders 20 of the sliding sleeve 2a, in this embodiment, are engaged by only two resilient lugs 23 each arranged at the damping ring and diametrically opposed to each other, whereby the lugs 22 latched out of the sliding sleeve 2a are arranged between aforesaid lugs 23.

Figure 5:
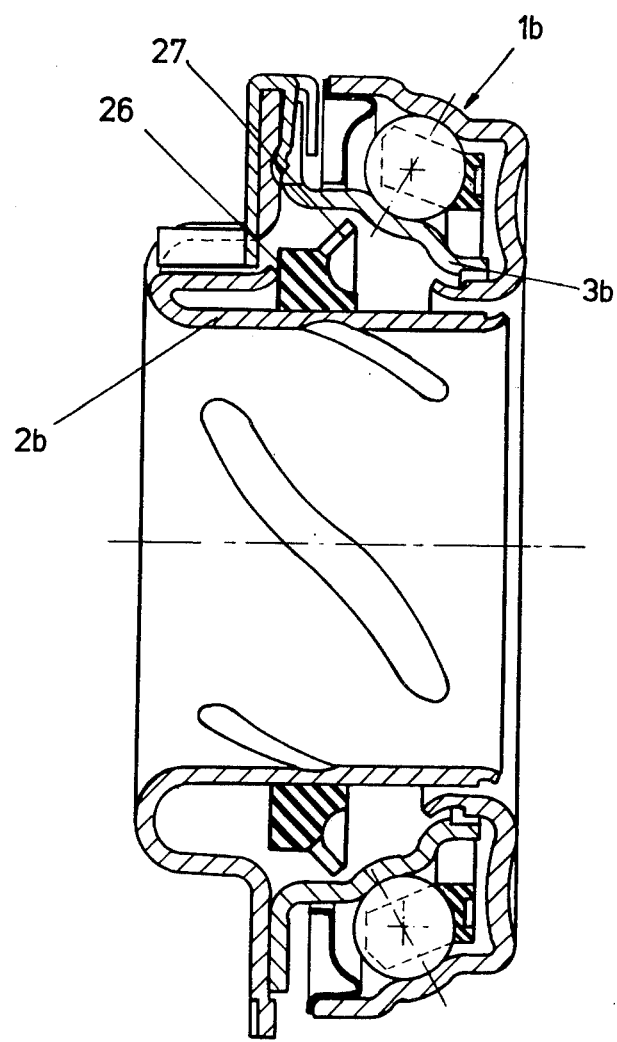
FIG. 5 is a cross-sectional view of another embodiment of a clutch thrust bearing, with a damping ring arranged on the jacket of the sliding sleeve.

FIG. 5 shows a clutch thrust bearing 1b distinguished from the bearing shown in FIG. 4 in that the damping ring 26 is mounted on the jacket of the sliding sleeve 2b, and that a certain amount of play has been provided between the inner race 3b and the resilient lugs 27.

Figure 9:
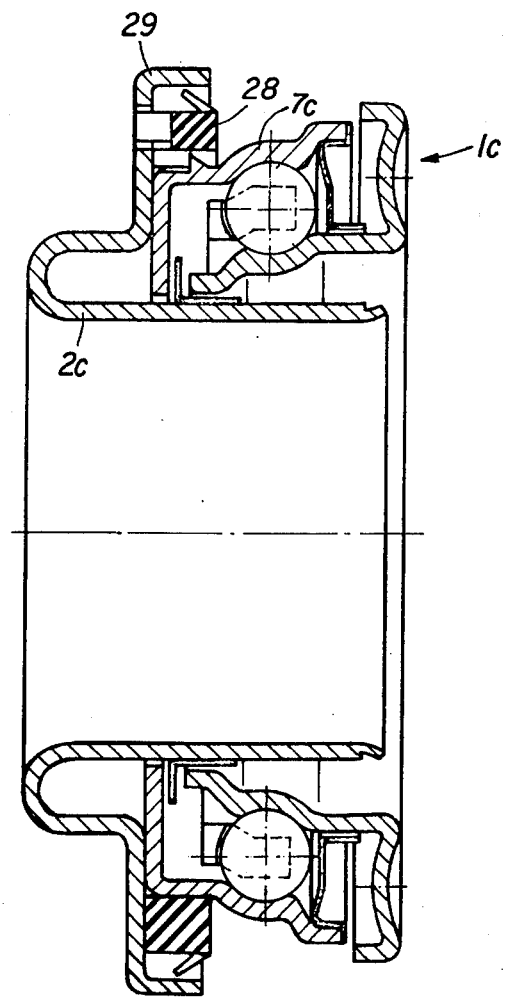
FIG. 9 is a cross-sectional view of another embodiment similar to FIG. 1.

FIG. 9 shows a clutch thrust bearing 1c distinguished from FIG. 1 in that the damping ring 28 is mounted on the outer race ring 7c for cooperation with a collar 29 portion of the sliding sleeve 2c.

Figure 6:
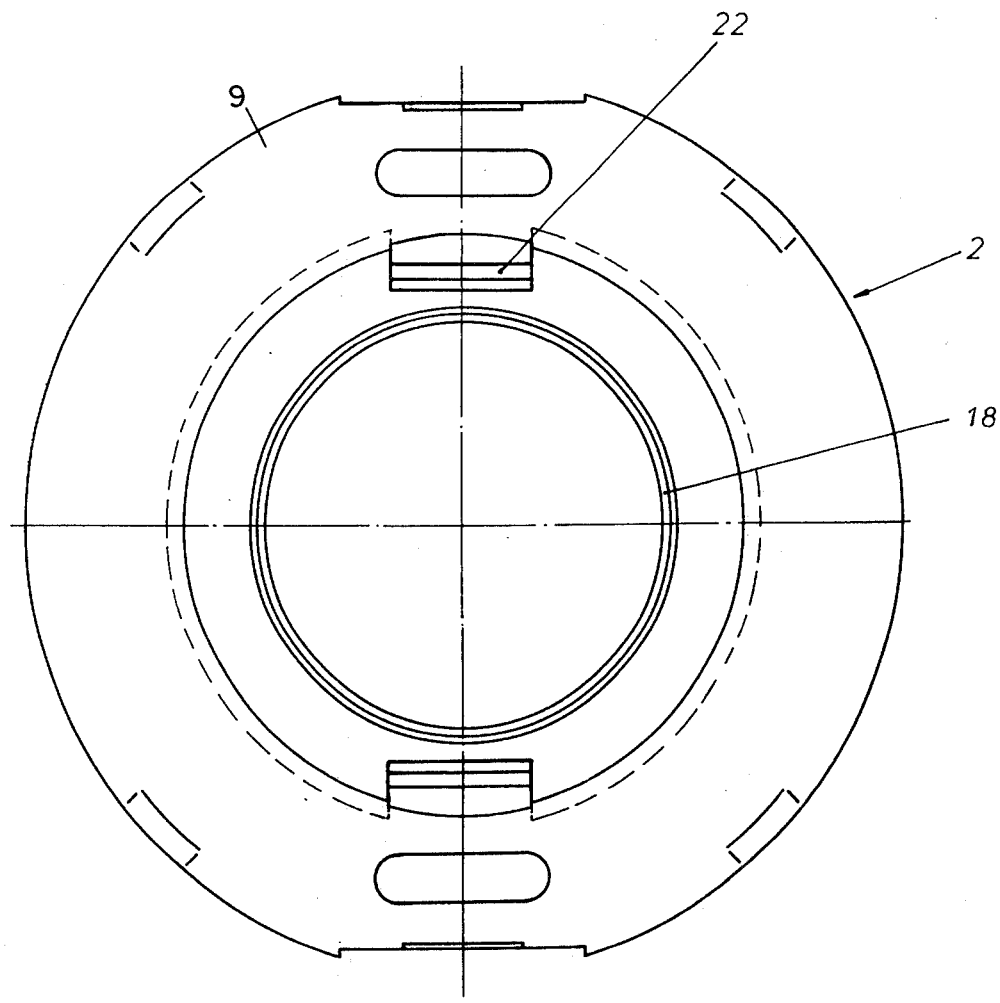
FIG. 6 is an axial right-end elevation view of the sleeve component of FIG. 1.
Figure 7:
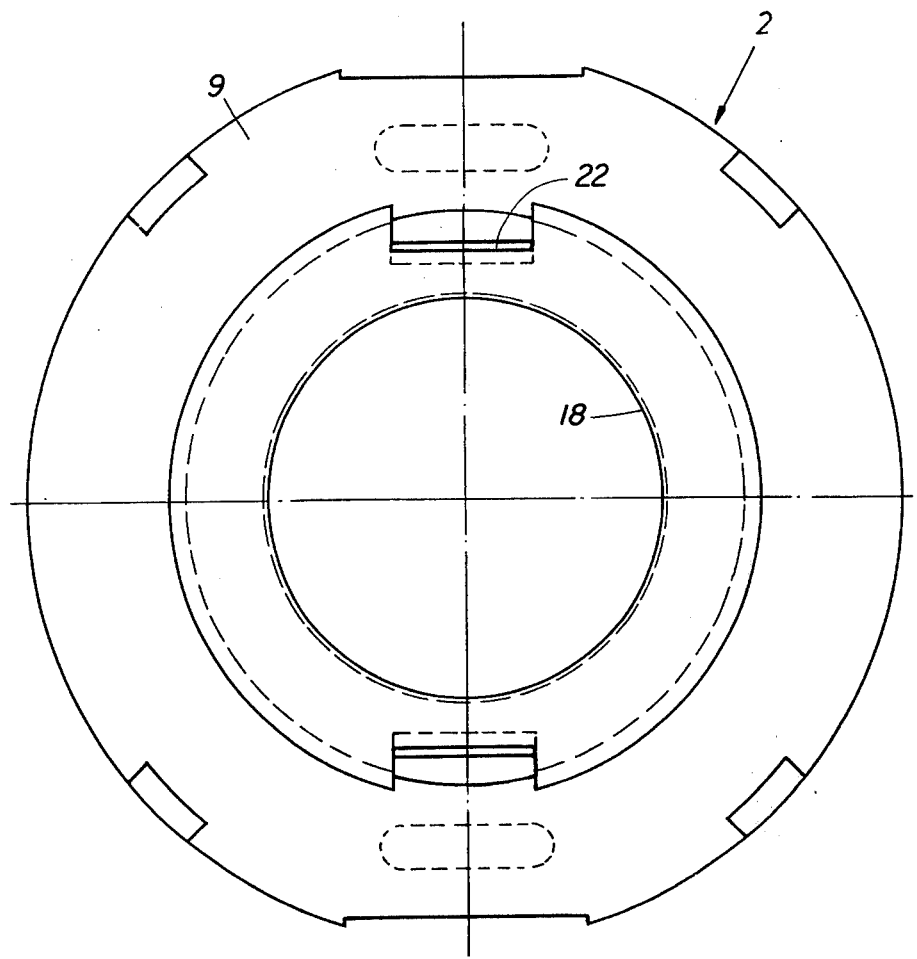
FIG. 7 is an axial left-end elevation view of the sleeve component of FIG. 1.
Figure 8:
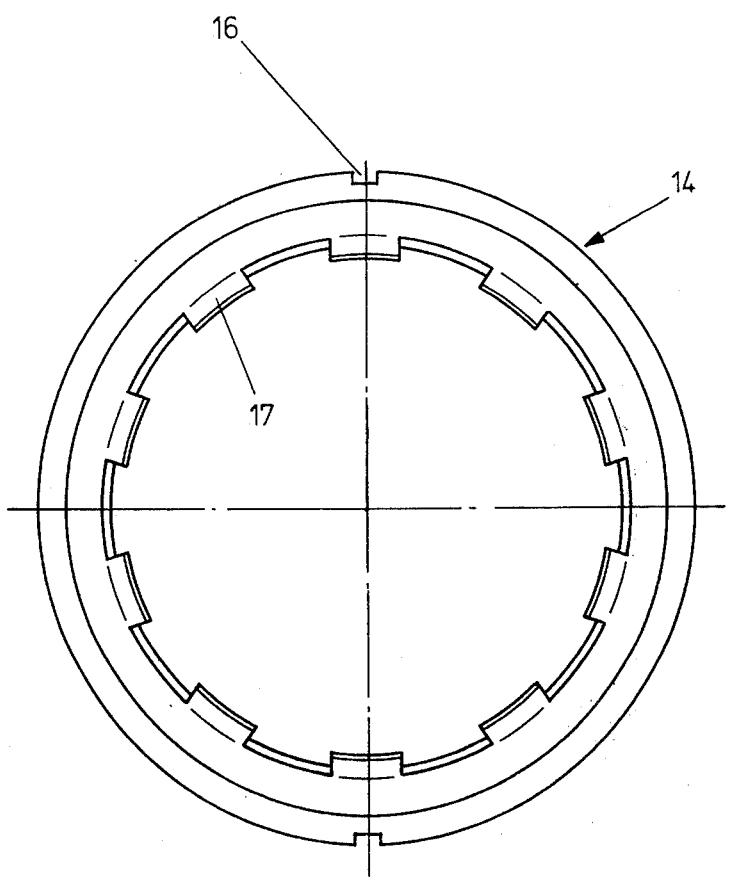
FIG. 8 is an axial elevation view of the end of the ring, opposite that shown in FIG. 3.

FIGS. 6, 7, and 8 are included merely to further clarify the structure of the sleeve and ring components; reference numbers on these drawings identify elements already disclosed and identified with the same numbers in other drawings.

The above described embodiments constitute only examples of a clutch thrust bearing according to the invention, with various alterations or changes possible in the individual components within the scope of the present invention.

What is claimed is:

1. In a self-centering clutch thrust bearing having a central axis and including inner and outer races, a plurality of rolling elements between said races, a sliding sleeve having at least a first annular part thereof situated radially inward of said inner race, said first annular part and said inner race having first and second facing surfaces, respectively, with an annular space defined therebetween, said sleeve being slightly movable radially relative to said inner race, thus defining radial play therebetween, and coupling means engaging and maintaining said sleeve and inner race in generally fixed axial relationship, the improvement in combination therewith comprising an elastic ring situated in said annular space on one of said first and second surfaces, the ring having resilient lugs extending toward the other of said surfaces for resiliently engaging the other of said surfaces during relative radial displacement therebetween, and thereby damping relative radial movement between said sleeve and inner race.

2. A bearing according to claim 1 wherein said ring is mounted on the inner race and the resilient lugs of the ring extend toward said sleeve.

3. A bearing according to claim 1 wherein said ring is mounted on the sleeve and the resilient lugs of the ring extend toward said inner race.

4. A bearing according to claim 1 wherein said ring comprises at least one axially-extending protrusion, and said sleeve comprises at least one abutment adjacent and circumferentially spaced from said protrusion, for damping relative rotational movement about the bearing axis between said inner race and said sleeve.

5. A bearing according to claim 1 wherein said ring has an inner bore surface adjacent said first facing surface of the inner race, and an outer circumferential surface adjacent said second facing surface of said sleeve, with at least one axial groove defined in one of said outer and inner surfaces of the ring, said bearing further comprising at least one radial projection extending from one of said facing surfaces into said groove, for permitting only limited rotational play of the ring relative to the associated race.

6. A bearing according to claim 5 wherein said groove is on the outer surface of the ring and said projection extends from the inner race.

7. A bearing according to claim 5 wherein said groove is on said bore surface of the ring and said projection extends from the sleeve.

8. A bearing according to claim 5 wherein said ring further comprises an annular axially extending shoulder with axially extending recesses therein, and said sleeve comprises radially extending elements for engaging said recesses while permitting said sleeve axial movement relative to said ring.

9. A bearing according to claim 8 wherein said elements are elastic.

10. A bearing according to claim 9 wherein said elements are inclined at an angle relative to each other.

11. A bearing according to claim 1 wherein said inner and outer races comprise sheet metal.

12. A bearing according to claim 11 wherein said sleeve comprises sheet metal.

13. A bearing according to claim 1 wherein said inner race is stationary relative to said outer race.

14. A bearing according to claim 5 wherein said coupling means fixedly engages one of said sleeve and inner race members and slidingly engages the other of said members, thereby permitting radial play between said members which is greater than the rotational play permitted by said radial projection into said axial groove in said ring.

15. A bearing according to claim 1, wherein said lugs of said ring extend at an angle inclined with respect to said bearing axis.

16. A bearing according to claim 1, wherein said inner race had a flange extending radially outward, and said sleeve has a similar and adjacent flange, and said coupling means comprises a bracket having first and second parts engaging said flanges of said race and sleeve respectively.

17. A bearing according to claim 16, wherein at least one of said first and second parts of said bracket is resilient.

18. In a self-centering clutch thrust bearing having a central axis and including inner and outer races, a plurality of rolling elements between said races, a sliding sleeve having a first annular part situated radially inward of said inner race and an annular collar part situated radially outward of said outer race, said collar part and outer race having first and second facing surfaces respectively, with an annular space defined therebetween, said sleeve being slightly movable radially relative to said outer race, thus defining radial play therebetween, the improvement in combination therewith comprising an elastic ring situated in said annular space on one of said first and second surfaces, the ring having resilient lugs extending toward the other of said surfaces at an angle inclined with respect to said bearing axes for resiliently engaging said other surface during relative radial displacement therebetween, and thereby damping relative radial motion between said sleeve and outer race.

19. A bearing according to claim 18, further comprising means engaging said sleeve and one of said races for limiting relative axial movement therebetween.

* * * * *